United States Patent [19]

Leonhardt

[11] Patent Number: 5,235,237
[45] Date of Patent: Aug. 10, 1993

[54] SURFACE-MOUNT PIEZOCERAMIC ACCELEROMETER AND METHOD FOR MAKING

[75] Inventor: Peter M. Leonhardt, Orange County, Calif.

[73] Assignee: Endevco Corporation, San Juan Capistrano, Calif.

[21] Appl. No.: 803,701

[22] Filed: Dec. 4, 1991

Related U.S. Application Data

[63] Continuation of Ser. No. 479,787, Feb. 14, 1990, abandoned.

[51] Int. Cl.⁵ .............................................. H01L 41/08
[52] U.S. Cl. ........................................ 310/329; 310/332; 310/344
[58] Field of Search .............................. 310/340–344, 310/330–332, 348, 346, 329; 73/517 R

[56] References Cited

U.S. PATENT DOCUMENTS

| | | | |
|---|---|---|---|
| 3,047,749 | 7/1962 | Fisher | 310/344 |
| 3,113,223 | 12/1963 | Smith et al. | 310/329 |
| 4,346,597 | 8/1982 | Cullen | 310/329 X |
| 4,348,905 | 9/1982 | Nishimura et al. | 310/329 X |
| 4,405,875 | 9/1983 | Nagai | 310/344 |
| 4,421,621 | 12/1983 | Fujii et al. | 310/344 X |
| 4,567,394 | 1/1986 | Frisch | 310/330 |
| 4,583,019 | 4/1986 | Yamada et al. | 310/348 X |
| 4,639,631 | 1/1987 | Chason et al. | 310/344 |
| 4,644,793 | 2/1987 | Church | 73/505 |
| 4,652,787 | 3/1987 | Zingg | 310/344 |
| 4,679,434 | 7/1987 | Stewart | 73/517 B |
| 4,734,068 | 3/1988 | Takoshima | 310/344 X |
| 4,742,182 | 5/1988 | Fuchs | 174/52 FP |
| 4,750,031 | 6/1988 | Miller et al. | 357/81 |

Primary Examiner—Mark O. Budd
Attorney, Agent, or Firm—Hamilton, Brook, Smith & Reynolds

[57] ABSTRACT

A piezoceramic accelerometer of the cantilever bending-beam bimorph type is provided with housing structure of straightforward easily-manufactured design. Because of its design features, the accelerometer is comparatively low in cost, rugged, reliable, and inherently low in internal capacitance. Consequently, a self-generated signal of favorable value proportionate to applied acceleration is provided by the accelerometer. The accelerometer provides for use of Surface Mount Technology (SMT), which allows further manufacturing cost reductions in uses of the accelerometer.

8 Claims, 2 Drawing Sheets

SURFACE-MOUNT PIEZOCERAMIC ACCELEROMETER AND METHOD FOR MAKING

This application is a continuation of application Ser. No. 479,787 filed Feb. 14, 1990 and now abandoned.

This invention relates generally to a piezoceramic cantilever beam accelerometer. More particularly, the present invention relates to a piezoceramic accelerometer wherein the housing of the device provides epoxy-sealed encapsulation of the piezoeceramic cantilevered bending-beam accelerometer, as well as providing for electrical connection to the accelerometer using surface mounting technology (SMT).

Conventional accelerometers employing a cantilever-mounted bimorph beam of piezoceramic material are well-known. However, all of these conventional accelerometers known to the Applicant are not suitable for SMT. Some of these accelerometers are comparatively large, are fragile in construction, are overly heavy, or require separate lead wires to be extended from the housing of the accelerometer to electrical circuitry external thereto. Other types of conventional accelerometers which do not presently suffer from all of the deficiencies of the bending-beam piezoceramic accelerometers are not themselves self-generating, in contrast to the piezoceramic devices. These other conventional accelerometers, therefore, require additional excitation, control or power supply circuitry which is not required of the piezoceramic devices. Also, the piezoceramic accelerometer offers advantages in miniaturization which are not available with other types of accelerometers.

Accordingly, it has become recognized that a small, lightweight, inexpensive, rugged, and reliable accelerometer which is self-generating and employs SMT is highly desirable. A piezoceramic cantilever beam structure offers a good starting point toward the realization of such an accelerometer. However, all conventional piezoceramic accelerometers suffer from some of the deficiencies outlined above.

In view of the above, the primary object of the present invention is to provide a piezoceramic bending beam accelerometer which, in satisfaction of the above-recited recognized needs, is small, rugged, light weight, reliable, and comparatively inexpensive. In order for the accelerometer to itself facilitate its use in low-cost serial manufacturing using the most cost-effective techniques, it must employ SMT, and require no separate lead wires to accomplish its connection to a circuit board.

In furtherance of these objectives the present invention provides a cantilever beam piezoceramic accelerometer comprising a housing defining a cavity therewithin, a mounting face, and a pair of spaced apart surface electrical contacts disposed on said mounting face of said housing; a piezoceramic beam having a marginal edge portion securing to said housing and a cantilever portion freely extending within said cavity, said piezoceramic beam including a respective pair of electrical contracts on opposite sides thereof at said marginal edge portion; said housing including electrical conduction means for connecting each of said pair of electrical contracts of said piezoceramic beam with a respective one of said pair of surface electrical contacts of said housing.

An advantage of the present invention resides in its comparatively straight-forward and inexpensive structure. The elegant structural simplification achieved by the present invention allows reductions in the cost of manufacture, and results in a rugged and reliable accelerometer which is safely handled by automated assembly machines. However, the straight-forward structure of the present accelerometer does not belie a sub-par or compromised performance. On the contrary, the acceleration sensing performance of the present accelerometer is favorably comparable with other conventional SMT accelerometers.

These and additional objects and advantages of the present invention will be apparent from a consideration of the following description of a particularly preferred embodiment of the invention, taken in conjunction with the appended drawing Figures, in which.

Figure 1:
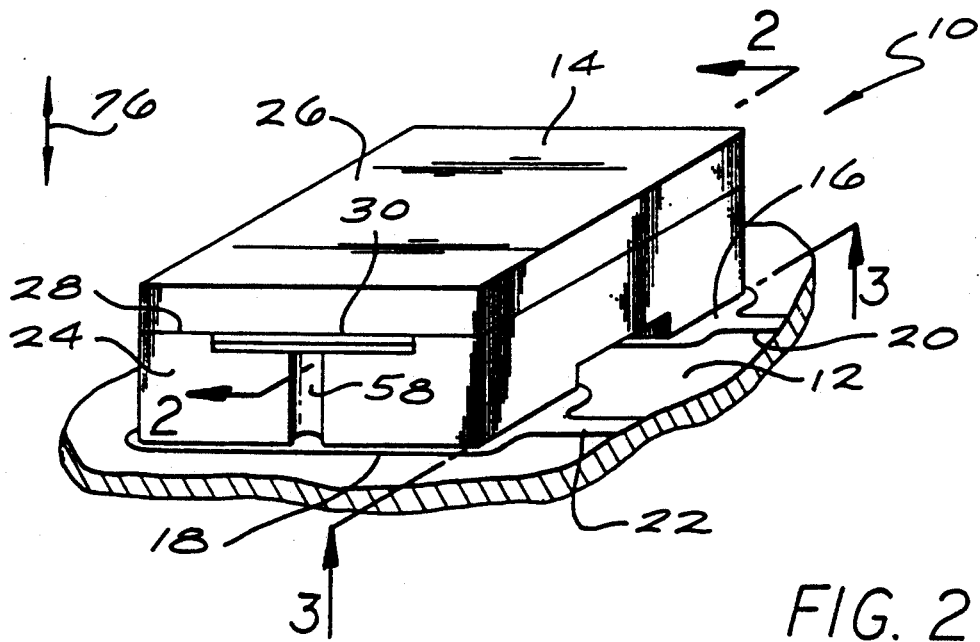
FIG. 1 is a perspective view of an accelerometer embodying the present invention.
Figure 3:
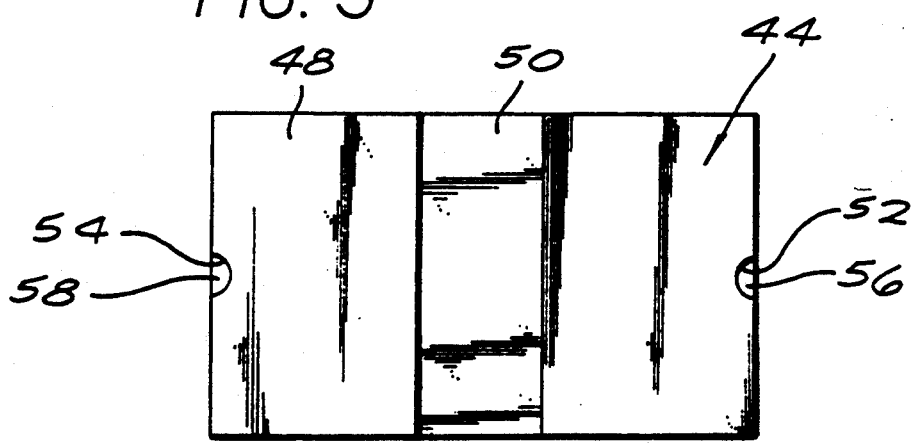
Figure 4:
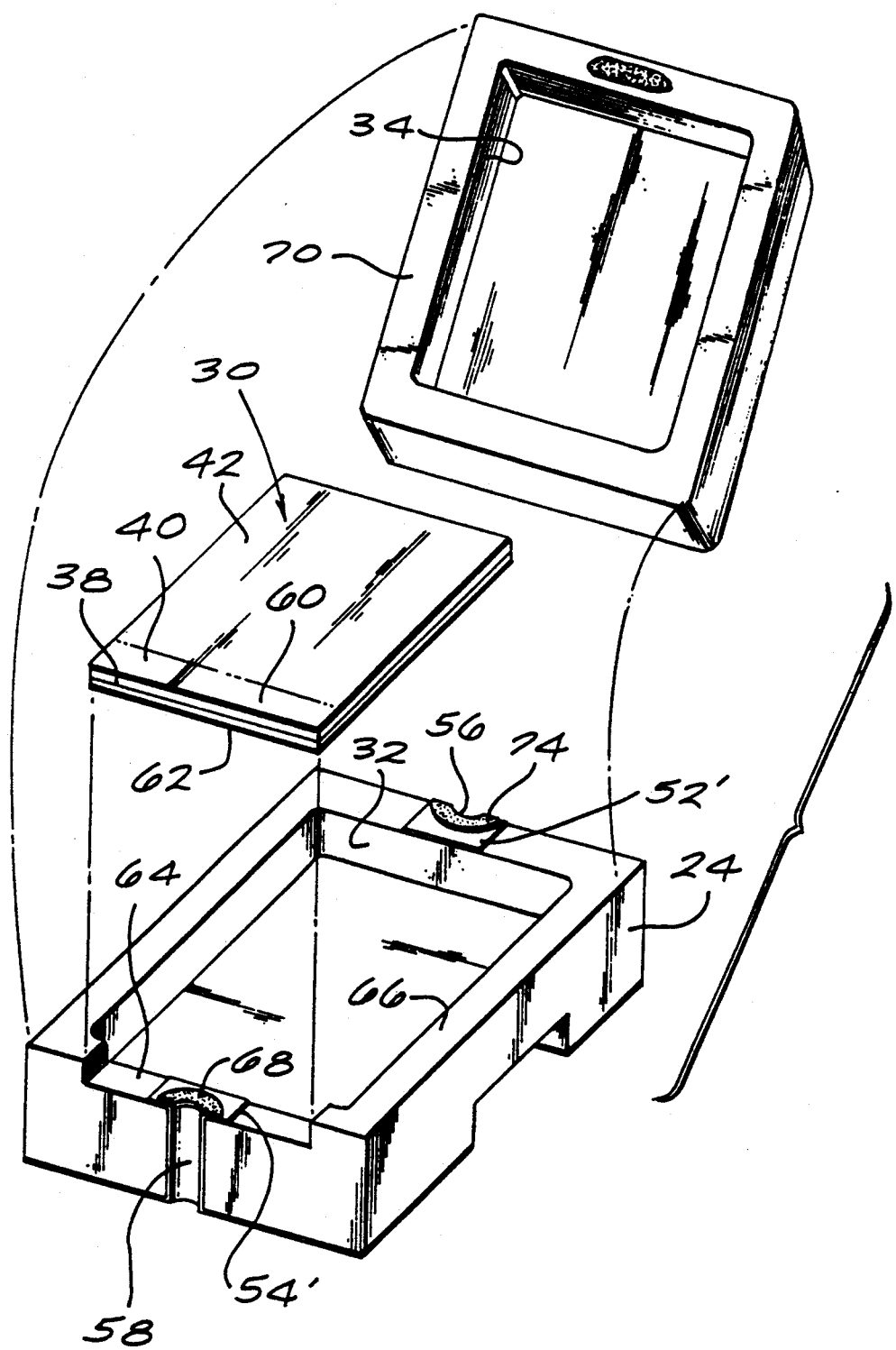

FIG. 3 provides a view of the underside, or mounting surface, of the accelerator seen in FIG. 1, as is represented by the arrows 3—3 of the latter Figure; and FIG. 4 is an exploded perspective view of component parts of the present accelerometer preparatory to their assembly into a complete accelerometer.

Viewing the drawing Figures in conjunction, and particularly FIG. 1, an accelerometer 10 is depicted mounted upon a printed circuit board 12 (only a fragment of which is depicted). The accelerometer 10 includes a housing, generally referenced with the numeral 14, which secures upon and is electrically connected to a pair of metallic mounting pads 16, 18 of the circuit board 12. A pair of metallic printed circuit elements 20, 22 extended respectively from the pads to other electrical circuitry of the circuit board 12.

Considering the accelerometer 10 more closely, and particularly the housing 14 thereof, it will be seen that the latter includes a ceramic base portion 24 and a ceramic top portion 26 which are adhesively intersecured along an interface plane 28, which interface plane appears as a joint line on the outer surface of the housing 14. Captured between the housing portions 24, 26 generally at the interface plane 28, is a bimorph piezoceramic element or beam 30, only a portion of which is visible viewing FIG. 1.

Figure 2:
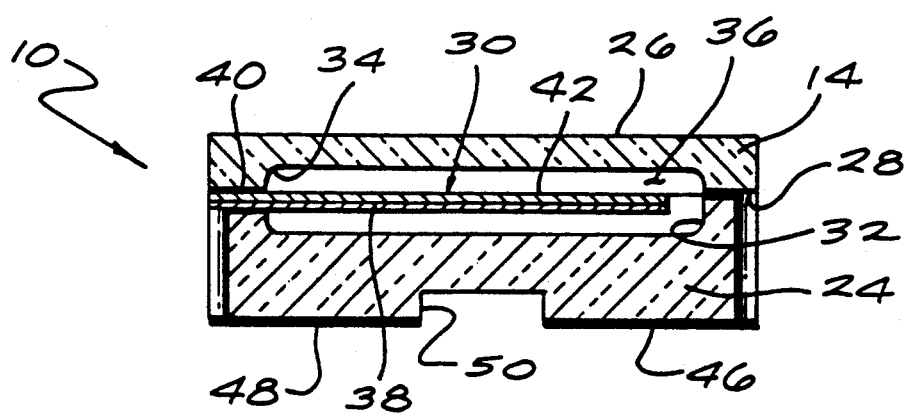
FIG. 2 is a transverse cross-sectional view taken generally along the plane defined by section arrows 2—2—2 of FIG. 1, and viewed in the direction of the arrows.

FIG. 2 shows that each of the housing portions 24 and 26 define one of a respective pair of confronting recesses 32, 34, which cooperatively define a cavity 36 receiving the piezoceramic element 30. The piezoceramic element is a bimorph, meaning it is a laminated piezoceramic of two opposite-polarity ceramic portions electrically and physical intersecured with conductive adhesive therebetween. This bimorph piezoceramic structure is well-known, and so will not be further described except to point out the lamination plane 38 whereat the piezo ceramic portions are interbonded. The piezoceramic element 30 is a rectangular prismatic solid, as is best seen viewing FIG. 4, and is captured at a marginal edge portion 40 thereof between the housing portions 24, 26. A cantilever portion 42 of the piezoceramic element 30 extends in the cavity 36 in spaced relation with the remainder of the housing 14.

Viewing FIG. 3; it will be seen that the lower, or mounting, face of the accelerometer 10, which is generally referenced with the numeral 44 and arrow, includes a pair of metallized surface portions 46, 48. The surface portions 46, 48 comprise the entire lower surface 44 of the housing 14, with the exception of a transecting groove 50 extending from one side to the other of the housing 14. In fact, the surface portions 46, 48 are defined by a surface metallization on the ceramic housing portion 24, which metallization is so thin that it is not distinguished from the material of the housing portion 24 except by heavy-weight line on the drawing Figures. The surface metallizations 46, 48 are not continuous across groove 50. By use of a conductive epoxy adhesive applied at the surface portions 46, 48, the accelerometer 10 may be securely mounted to, and electrically connected with, the mounting pads 16, 18 of the circuit board 12. Electrically connecting with the respective surface metallizations 46, 48 are surface metallization portions 52 and 54 disposed in respective grooves 56, 58 of the base portion 24.

The exploded perspective view of FIG. 4 shows that the piezoceramic element 30 carries a pair of surface metallizations 60, 62 (only one of which is visible in FIG. 4) completely covering the opposite sides thereof including the marginal edge portion 40. The surface metallizations 60, 62 provide electrical contact with the opposite-polarity ceramic portions of the piezoceramic element 30. The housing portion 24 defines a seat 64 in the form of a groove opening outwardly from recess 32 and into which the marginal edge portion 40 of piezoceramic element 30 is received. The seat 64 is substantially equal in depth, with respect to a planar interface surface 66 of the housing portion 24, as the thickness of the marginal edge portion 40.

In order to insure electrical conductivity of the surface metallization 62 with mounting surface metallization 48 (via metallization 54) an area of surface metallization 54' is provided in seat groove 64 and electrically continuous with the metallization 54 in groove 58. Also, a region of conductive epoxy 68 is applied at the juncture of groove 58 and metallization 62 upon the area 54' of surface metallization. The remainder of seat 64 is surface with an interface layer of structural epoxy (not illustrated) so that the element 30 is secured in the seat 64. As secured into the seat 64, the element 30 is disposed with surface metallization 60 at the level of interface surface 66.

Similarly, in order to provide electrical connection of the surface metallization 60 with mounting surface metallization 46, the top portion 26 carries a peripheral surface metallization 70 circumscribing the recess 34 and defining an interface surface confronting surface 66. At the groove 56, the surface metallization 52 is carried onto surface 66 to define an area of surface metallization referenced with numeral 52'. Disposed upon the surface metallization 70 in congruence with surface metallization 60 of the piezoceramic element 30, is a region of conductive epoxy 72. At the opposite end of the housing 14, a region of conductive epoxy 74 connects surface metallization 70 with the metallization 52'. The remainder of surface 70 is bonded to surface 66 (including the surface 60 of piezoceramic element 30) using a structural epoxy to effect sealing and structural integrity of housing 14.

Having observed the structure of the accelerometer 10, apparatus may now be turned to its operation. Viewing FIG. 1 once again, the accelerometer 10 is adhesively secured and electrically connected to the pads 16, 18 on circuit board 12 by conductive epoxy between the pads and the surface metallizations 46, 48 of the accelerometer housing. Consequently, when an acceleration (represented by arrow 76 viewing FIG. 1) is applied to the circuit board 12 along a vector perpendicular thereto, the beam-like piezoceramic element 30 flexes in response to the acceleration force. As is well-known in the art, the flexure of the two opposite-polarity piezo crystals of the bimorph element 30 results in an electrical charge across the opposite faces of the crystal. In the piezoceramic element 30, these opposite charges are collected at the surface metallizations 60 and 62.

From the surface metallization 62, the electrical charge is conducted via the conductive epoxy 68 to metallization 54' in groove 64 and metallization 54 in groove 58, and thence to surface metallization 48 on the mounting face 44 of the accelerometer. Likewise, from the surface metallization 60, the electrical charge is conducted via conductive epoxy 72 into the peripheral metallization 70 circumscribing the recess 34. As noted earlier, the surface metallization 70 is electrically connected by conductive epoxy 74 to the metallization 52' on surface 66 and to metallization 52 in groove 56. Therefore, the electrical charge from metallization 60 of element 30 is conducted to surface metallization 46 on the mounting face 44.

An important feature of the accelerometer herein described is its inherently low capacitance. As can easily be appreciated, the piezoceramic element 30 provides electrical charge in response to stressing of the piezoceramic portions thereof. Were the electrical connections between the piezoceramic element 30 and measurement circuitry external to the accelerometer to provide a high capacitance, the produced charge would simply be absorbed in large part into this capacitance. Therefore, it is important to note that the structure of accelerometer 10 is substantially free of capacitance-forming features. For example, the sections 46 and 48 of surface metallization because of their spaced apart and edge-on orientation minimize the capacitance resulting from these metallization areas. Only a relatively small fraction of the surface metallization 48 is in spaced apart face-to-face confronting relation with a portion of the surface metallization 70. However, the area of the surface metallization 70 in confronting relation with metallization 48 is very small. Consequently, accelerometers embodying the present invention have shown an internal capacitance of about 550 pF, with a charge sensitivity to acceleration along the principle is of 2.00 pC/g. This combination of charge sensitivity and low internal capacitance results in an electrical output from the accelerometer 10 which is easily accommodated by measurement circuitry external to the accelerometer.

The present accelerometer is seen to fulfill all of the objectives set out above. The structure of the accelerometer is straightforward, comparatively inexpensive to manufacture, rugged and reliable in use, and is easily handled with modern SMT manufacturing techniques. Accelerometers embodying the present invention will survive 5000 G's without damage. Yet, should the cantilever portion 42 of the beam 30 break off, the housing 14 completely contains this fractured part so that it does not present a potential short circuit element for other electrical circuitry neighboring the accelerometer. While the invention has been depicted and described by reference to one particularly preferred embodiment thereof, such reference does not imply a limitation upon the invention, and no such limitation is to be inferred. The invention is intended to be limited only by the spirit and scope of the appended claims, which provide additional definition of the invention.

What is claimed is:

1. A piezoceramic accelerometer comprising:

a chambered housing including a solid base portion having a lower mounting surface which is divided into a pair of surface-contact areas by a transverse groove defined thereon, a first surface metallization carried upon each of said surface-contact areas to define a pair of external surface electrical contacts for said accelerometer, a pair of vertical grooves defined by said base portion and each extending upwardly along opposite end surfaces of said housing and each at lower ends thereof intersecting with a respective one of the pair of surface contact areas of said housing, second surface metallization extending the entire length of each of said pair of vertical grooves to electrically connect with a respective one of said pair of surface contact areas, said base portion defining a respective recess opening upwardly thereon to define an upwardly disposed peripheral first interface surface circumscribing said recess, a seat groove extending transversely to open outwardly from said base portion recess across said first interface surface at an end surface of said housing in intersection with one of said vertical grooves;

a bimorph piezoceramic beam received at a marginal edge portion thereof into said seat groove with an upper face thereof in alignment with said first interface surface, said beam including a pair of oppositely disposed upper-surface and lower-surface electrical contacts at said marginal edge portion, said lower-surface electrical contact being in electrical continuity with said second surface metallization at said seat groove, and said beam including a cantilevered free portion extending into said base portion recess in spaced relation with the remainder of said base portion; and a solid housing top portion congruent with said base portion, said top portion defining a recess opening downwardly and defining a peripheral downwardly disposed second interface surface, said top portion recess and second interface surface being congruent with and confronting said base portion recess and first interface surface, a third surface metallization carried upon said (peripheral) second interface surface and extending about said recess from one end thereof to the other, said top portion being secured at said (peripheral) second interface surface thereof to said base portion at said first interface surface, and said third surface metallization of said top portion being in electrical continuity with both said upper-surface electrical contact of said piezoceramic beam and said second surface metallization in the other of said pair of vertical grooves.

2. The invention of claim 1 wherein electrical continuity between said upper surface electrical contact of said piezoceramic beam and said second surface metallization in one of said pair of vertical grooves of said base portion, and said third surface metallization carried upon said second interface surface of said top portion, are all effected by use of controlled areas of conductive epoxy.

3. The invention of claim 2 wherein said piezoceramic beam is mounted into said seat groove, and said top portion is secured to said base portion to trap said beam within said housing chamber and seal the latter, all with structural epoxy.

4. A piezoceramic accelerometer comprising:

a chambered housing including a solid base portion and a top portion defining a cavity therebetween the base portion having a lower mounting surface which is divided into a pair of surface-contact areas, a first surface metallization carried upon each of said surface-contact areas to define a pair of external surface electrical contacts for said accelerometer, a pair of vertical areas defined by said base portion and each extending upwardly along opposite end surfaces of said housing and each at lower ends thereof intersecting with a respective one of the pair of surface contact areas of said housing, second surface metallization extending the entire length of each of said pair of vertical areas to electrically connect with a respective one of said pair of surface contact areas, a recess on a periphery between the top portion and base portion, a planar area extending transversely across said recess at an end surface of said housing in intersection with one of said vertical areas;

a bimorph piezoceramic beam received at a marginal edge portion thereof into said planar area with an upper face thereof in alignment with said recess, said beam including a pair of oppositely disposed upper-surface and lower-surface electrical contacts at said marginal edge portion, said lower-surface electrical contact being in electrical continuity with said second surface metallization at said planar area, and said beam including a cantilevered free portion extending into said cavity; and said top portion being congruent with said base portion and having a peripheral surface congruent with and confronting said base portion, a third surface metallization carried upon said peripheral surface and extending about said peripheral surface from one end thereof to the other, said top portion being secured at said peripheral surface thereof to said base portion at a peripheral surface of said base portion, and said third surface metallization of said top portion being in electrical continuity with both said upper-surface electrical contact of said piezoceramic beam and said second surface metallization in the other of said pair of vertical areas.

5. The invention of claim 4 wherein the base portion is formed of metallized ceramic.

6. The invention of claim 4 wherein said piezoceramic beam is mounted into said planar area, and said top portion is secured to said base portion with structural epoxy adhesive.

7. The invention of claim 4 wherein the surface contact areas are separated by a transverse groove formed on the base portion.

8. The invention of claim 4 wherein the housing is a rectangular prismatic structure.

* * * * *